Feb. 17, 1931.      S. V. DILLON      1,792,898
SWAB AND UNLOADER
Filed March 8, 1929      2 Sheets-Sheet 1
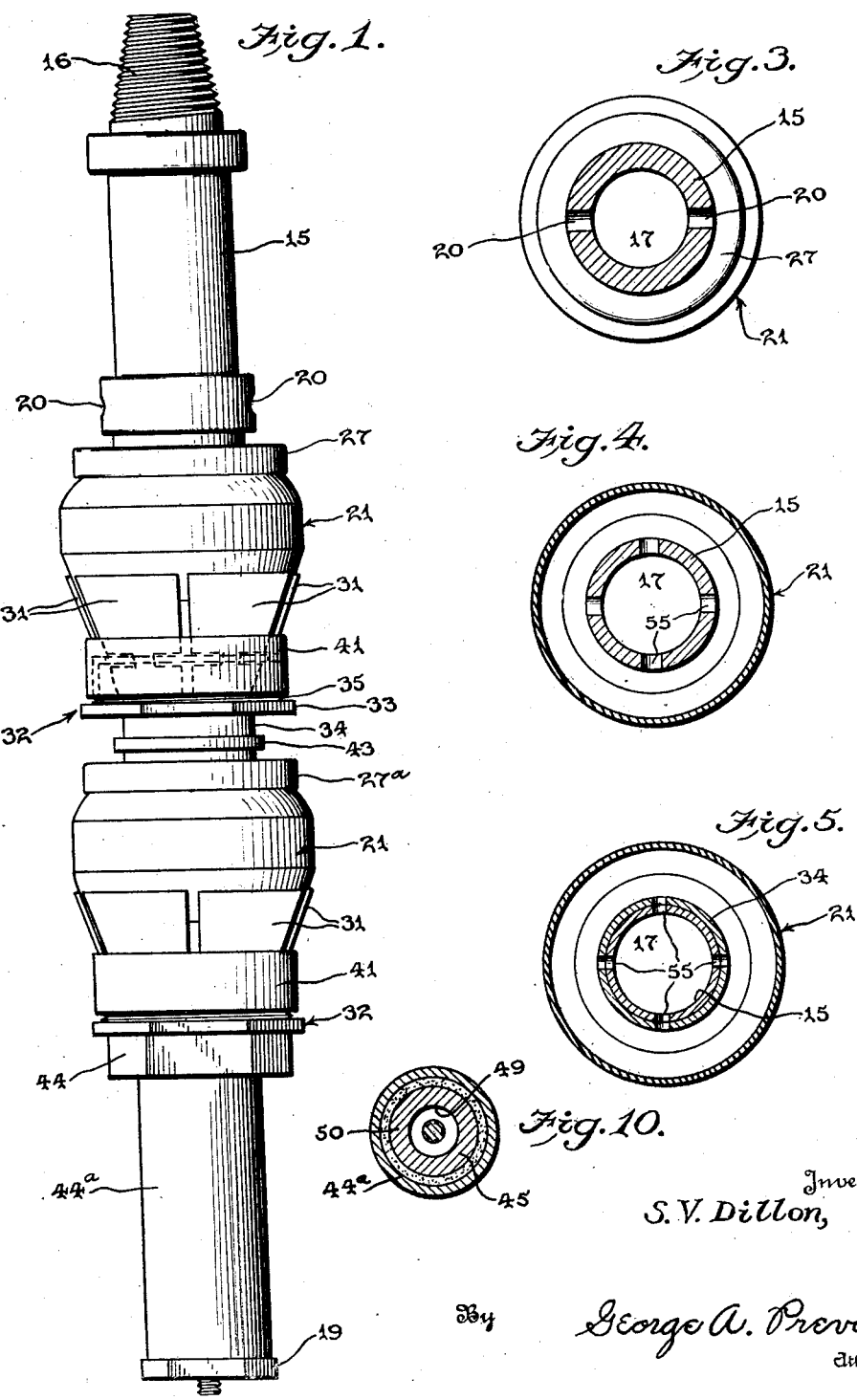
Inventor
S. V. Dillon,
By George A. Prevost
Attorney

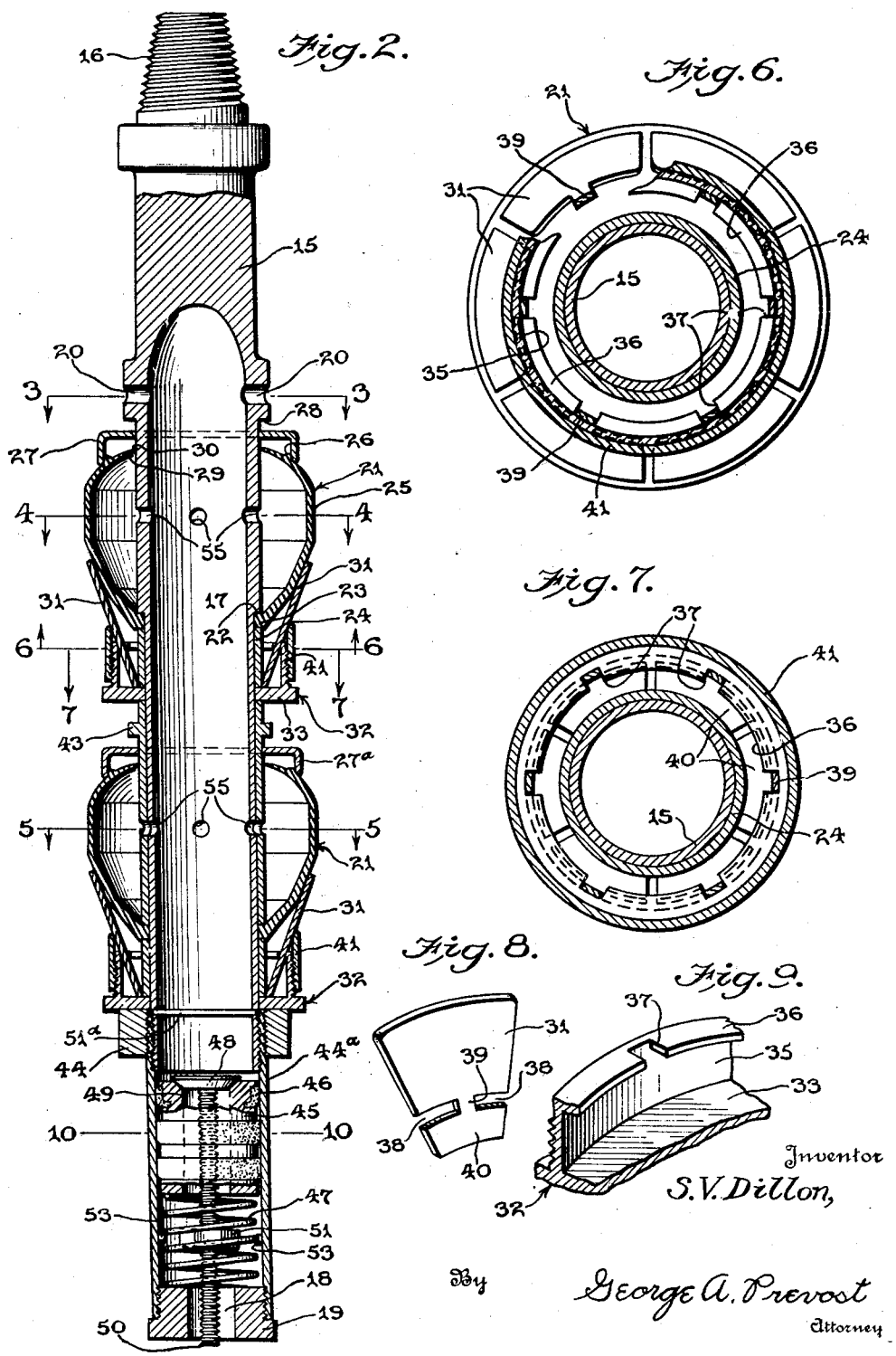

Patented Feb. 17, 1931

1,792,898

UNITED STATES PATENT OFFICE

STEPHEN V. DILLON, OF TULSA, OKLAHOMA

SWAB AND UNLOADER

Application filed March 8, 1929. Serial No. 345,464.

This invention relates to improvements in swabs for use with oil wells or the like, and more particularly to a novel swab designed to automatically space itself from the inner surface of the tubing or casing while descending and to automatically expand in ascending to provide snug engagement between the swab and the tubing or casing while the swab is being raised.

One of the objects of the invention is to furnish a swab including an elastic ball-like packing member or members mounted on a tubular stem through which a part of the well fluid passes while the swab is descending; the interior of the ball-like packing member or members communicating with the passageway through the stem so that the pressure of the well fluid will be radially exerted on the packing member or members during the elevation of the swab.

Another object is to furnish a swab of this character in which one end portion of each packing member is gradually tapered towards its edge to increase its flexibility and permit the packing member to readily move toward the axis of the tubular stem when the swab is in the act of descending.

A further object is to provide a swab in which a ball-like packing member is combined with a movable cap which cooperates with the packing member to limit the expansion of the latter and thereby prevent rupturing of the same, due to unevenness in tubing or casing joints or in the pipe itself during the ascent of the swab.

Another object is to furnish novel protecting means for the lower portion of the ball-like packing member or members; said protecting means comprising rigid leaves hingedly connected to the swab stem by special joints and cooperating with an adjustable member which functions to limit the outward movement of the upper ends of the protecting leaves. The special joints connecting the protecting leaves to the swab stem allows the leaf cage and the leaves to be readily assembled or dismantled when the cage and leaves are detached from the swab stem.

A still further object is to provide an improved unloader especially adapted for use with swabs and designed to release the fluid pressure from the swab during ascent, in case such pressure reaches a point where it might break or damage the swab parts, or weigh the swab down to the point where it would break away from the hoisting cable or the like.

Heretofore, the unloaders used with swabs or the like have permitted leakage of the fluid past the valve of the same, and I have designed my improved unloader to eliminate this objection. This is primarily brought about by the use of flexible cups or packing rings on a hollow piston which forms the seat for the unloader valve. The use of such cups permits tight joints, even though sand or the like should penetrate between the unloader piston and its guide surface.

Another object is to furnish an unloader, including a valve having a stem provided with an adjustable abutment or nut designed to engage a fixed surface for the purpose of releasing or unloading at predetermined pressures.

A further object is to furnish an unloader, including spring means for normally holding the unloader piston at a predetermined elevation; the construction being such that the swab will continue operative even though said spring means breaks and thereby destroys the function of the unloader.

With the foregoing objects outlined and with other objects in view which will appear as the description proceeds, the invention consists in the novel features hereinafter described in detail, illustrated in the accompanying drawings, and more particularly pointed out in the appended claims.

Referring to the drawings,

Fig. 1 is an elevation of my improved swab and unloader.

Fig. 2 is a vertical longitudinal sectional view of the same.

Fig. 3 is a transverse horizontal sectional view on the line 3—3 of Fig. 2.

Figs. 4, 5, 6, and 7 are similar views, taken respectively on the lines 4—4, 5—5, 6—6 and 7—7 of Fig. 2.

Fig. 8 is a perspective view of one of the protecting leaves.

Fig. 9 is a fragmentary perspective view of the protecting leaves cage.

Fig. 10 is a horizontal sectional view on the line 10—10 of Fig. 2.

In the drawings, 15 indicates a swab stem which may have a conventional threaded pin 16 at its upper end. The stem is provided with a longitudinal passageway 17, through which well fluid may flow on the descent of the swab. This fluid will flow in through an inlet 18, provided in a plug 19 at the lower end of the swab, and it will be discharged through ports 20 at the upper end of the passageway.

A ball-like packing member 21 of rubber or the like, has its lower, preferably thickened, end secured to the stem by any suitable means. For this purpose, I may, for example, arrange a shoulder 22 on the exterior of the stem, and the annular edge 23 of the packing member may be held in tight engagement with said shoulder by means of a spacing collar 24. In this way, the lower end of the packing member is prevented from shifting along the stem.

I prefer to make the packing member of annular united walls, which are straight lengthwise of the stem, and these walls are arranged at angles to one another, so that the cylindrical one 25, during the ascent of the swab, will have a large surface in contact with the inner surface of the tubing or casing, but no contact during descent.

An integral bead 26 is provided on the exterior of the packing member near its upper end, and this bead engages the inner surface of the skirt of an annular cap 27, which may be made of any suitable material, such as metal, and may slide up and down on the stem. Its upward movement is limited by a shoulder 28, arranged on the stem.

In order that the packing member may readily flex to permit well fluid to pass between the same and the inner surface of the tubing or casing on descent, and to facilitate the passage of the swab past joints or rough places in the pipe, its upper edge portion is preferably gradually tapered toward its extremity, as shown at 29, and the tapered part preferably extends from the bead 26, to the extreme edge 30 of the packing member. At this point, it might be noted that the tapered edge 29 may readily move within the inverted cap 27, and that the latter protects the packing member on ascent, and prevents too great expansion of the upper end portion of the same during descent.

The lower portion of the packing member is also protected in my improved swab, and to this end, rigid leaves 31, of metal or the like, embrace the lower portion of the packing member. These leaves are preferably spaced relatively to one another, and they are supported and interlocked with a cage 32. This cage includes a horizontal annular bottom 33 which is held by a spacing sleeve 34 against the lower end of the collar 24; and a cylindrical wall 35 rises from said bottom and terminates at its upper end in an inwardly extending bead or ledge 36, provided with spaced notches 37. When the cage is off the swab stem, the protecting leaves 31 are assembled with the cage, and to permit this, the lower portion of each leaf is provided with opposite notches 38 which extend toward a neck 39 that joins the upper and lower portions of the leaf and is adapted to enter one of the notches 37 of the cage. Due to this construction, it may be seen that the lower part 40 of each leaf will occupy the cage and the joint provided by the neck 39 and the notch 37 forms in effect a hinge connection which will permit the upper end portion of the leaf to move toward or away from the axis of the stem. Each leaf should be of substantially triangular form, with the base of the triangle uppermost, to provide a relatively large bearing surface for the exterior of the packing member 25.

After the cage with the protecting leaves assembled thereon is placed on the stem, the inner ends of the notches 37 of the cage will be substantially closed by the spacing collar 24, and this will prevent the leaves from accidentally detaching themselves from the cage.

A vertically adjustable collar 41 has threaded engagement with the vertical wall of the cage, and the outer surfaces of the protecting leaves bear against the upper edge of the adjustable collar, and this allows the upper ends of the leaves to be pressed inwardly if desired. Of course, if the adjustable collar is eliminated, the leaves will simply bear against the upper edge of the wall of the cage.

It will be manifest to those skilled in the art that in many instances, a single unit composed of the packing member 21, cap 27, protecting leaves 31 and cage 32, may be employed as part of a swab, but I prefer to use two or more units for this purpose. In such cases, the spacing sleeve 34 may be provided with a stationary shoulder 43 to limit the upward movement of the cap 27a of a second unit, and the remainder of that unit may be substantially the same as the unit previously described. The parts may be held in assembled relation by means of a threaded nut 44 which will engage with the threaded lower end of the stem.

As heretofore mentioned, the swab may be combined with my improved unloader, and in such a case, a threaded sleeve 44a may serve as the housing or casing, of the unloader. This sleeve forms a cylinder in which a hollow piston 45 may vertically reciprocate, and this piston is preferably provided with one or more cup washers 46 of leather, rubber or any other suitable flexible material. These packing rings will prevent any leakage of the well fluid from the passageway 17, between the piston and its cylinder 44a, and will maintain a tight joint, even though sand or the like should work its way in between the piston and its barrel.

A coiled spring 47 rests on the threaded plug 19, and normally supports the hollow piston, and a valve 48 normally seats on the hollow piston during ascent, and prevents any passage of fluid through the passageway 49 of the piston. The valve is preferably provided with a stem 50, which extends downwardly through the hollow piston and the plug 19, and this stem is threaded for a portion of its length in order to adjustably mount the nut 51 on the same. The upward movement of the valve 48 is limited by a pin 51a which extends across the passageway 17.

In the operation of the unloader, assuming that the swab is ascending and the pressure of the well fluid in the passageway 17 becomes sufficient to depress the piston 45 a certain distance, then the nut 51 will abut against the plug 19 and stops, and as the piston continues to descend, the valve seat on the piston will move away from the valve 48, so that the liquid from the passageway 17 will be released. In such release, the liquid will flow downwardly through the ports 49 and 18. Of course, by adjusting the nut 51, the valve may be caused to open under predetermined pressure, and thus prevent damage to the swab, or breaking of the swab away from its hoisting cable or the like.

It may be mentioned at this point that the cup washers 46 or the like, provide self-adjusting means for sealing the joint between the piston and its cylinder, and the greater the pressure of the fluid outwardly on these washers, the tighter will be the joints.

In order to permit the swab to continue to function, even in case the spring 47 should break, I prefer to provide the cylinder 44 with an internal shoulder 53 which will limit the downward movement of the piston in case of breakage of the spring. Under such circumstances, it will be seen that in case the spring should break, the piston will simply move downwardly on to the shoulder 53, and at that time, the valve 48 will remain seated on the piston 45.

When the spring 47 is not functioning, the nut 51 must be raised on the stem 50 to permit the piston 45 to engage the shoulder 53 without allowing the nut 51 to contact with the plug 19, for otherwise, the valve 48 would always be disengaged from its seat before the piston comes to rest on the shoulder 53.

Ports 55, place the passageway 17 in constant communication with the interior of the packing members 21, and when the swab is travelling upwardly, the liquid in the passageway will exert pressure through these ports to cause the walls 25 of the packing members to snugly engage the inner surface of the tubing, casing or well, and thus provide a tight joint.

In operation, assuming that the swab is being lowered in the well, the well fluid will flow or be displaced through the swab as well as around the same. Some of the fluid will pass through the port 18, cylinder 44a, port 49, passageway 17, and ports 20, while another portion of the fluid exteriorly of the swab, will pass between the packing members 21 and the wall of the well, tubing or casing. On the other hand, when the swab is lifted, the well fluid above the same will be prevented from travelling past the swab, due to the fact that the packing members 21 will be expanded into engagement with the wall of the well by fluid entering through the ports 55, and the fluid cannot flow downwardly through the passageway 17, as the lower end of such passageway will be closed by the valve 48. However, if the weight of the fluid above the swab is sufficient, the valve 48, as well as the piston 45, will descend and compress the spring 47, and as soon as the nut 51 impinges against the plug 19, the valve will be halted while the piston 45 will continue to descend. Thus, communication between the passageway 17 and the ports 49 and 18 will be established, and the swab will be unloaded.

Obviously, when the swab is ascending or descending, the packing members 21 will be protected by the caps 27, 27a, and the leaf protectors 31.

From the foregoing it is believed that the construction, operation and advantages of the invention may be readily understood, and I am aware that changes may be made in the details disclosed, without departing from the spirit of the invention, as expressed in the claims.

What I claim and desire to secure by Letters Patent is:

1. In a swab, a stem, a hollow ball-like elastic member mounted on the exterior of the stem and having a substantially spherical inner surface spaced from said stem, and means for protecting the end portions of said elastic member, one end of said member being fixedly secured to said stem and the other end and its protecting means being free to rise and fall relatively to the stem.

2. In a swab, a tubular stem, a hollow ball-like thin-walled packing member mounted on the stem and adapted to contract during the descent of the swab, means fixedly securing one end of said member to the stem, the opposite end of said member being free to rise and fall on the stem.

3. In a swab, a tubular stem, a hollow ball-like packing member surrounding the stem and having its lower end fixedly secured to the stem, the upper end of said member embracing the stem and adapted to move upwardly and downwardly on the same.

4. A swab including a hollow stem, and a ball-like hollow elastic packing member surrounding the stem and having one of its ends fixedly connected to the latter, said packing member having a substantially spherical inner surface spaced from said stem, the opposite end of said member having its wall tapering toward the edge of the same, the last mentioned end of the packing member being adapted to move upwardly and downwardly on the stem.

5. A swab including a hollow stem and a ball-like hollow packing member surrounding the stem and having one of its ends fixedly connected to the latter, said packing member having a substantially spherical inner surface spaced from said stem, the opposite end of said member having its wall tapering toward the edge of the same, the last mentioned end of the packing member being adapted to move upwardly and downwardly on the stem, and a cap slidably mounted on the stem and engaging the packing member.

6. A swab including a hollow stem, and a ball-like hollow packing member surrounding the stem and having one of its ends fixedly connected to the latter, the opposite end of said member having its wall tapering toward the edge of the same, the last mentioned end of the packing member being adapted to move upwardly and downwardly on the stem, a cap slidably mounted on the stem, and a projecting portion on the packing member engaging said cap.

7. A swab including a hollow stem, and a ball-like hollow packing member surrounding the stem and having one of its ends fixedly connected to the latter, the opposite end of said member having its wall tapering toward the edge of the same, the last mentioned end of the packing member being adapted to move upwardly and downwardly on the stem, and ports placing the interior of the stem in communication with the interior of the packing member.

8. In a swab, a hollow stem, a ball-like hollow packing member surrounding the stem and having its lower end fixedly secured to the stem, the upper end of the packing member embracing the stem and being adapted to move upwardly and downwardly on the same, the upper end portion of the packing member being provided with a projection, and a cap slidably mounted on the stem and engaging said projection.

9. In a swab, a stem, a hollow packing member mounted on the stem, and protecting leaves hingedly mounted on the stem and bearing against said packing member.

10. In a swab, a stem, a hollow packing member mounted on the stem, and a series of rigid protecting leaves hingedly mounted on the stem and bearing against the outer surface of the packing member.

11. In a swab, a stem, a hollow packing member mounted on the stem, a notched cage mounted on the stem, and protecting leaves having necks engaging the notches of the cage, said leaves bearing against the outer surface of the packing member.

12. In a swab, a stem, a ball-like packing member surrounding the stem and mounted on the latter, a cage mounted on the stem and provided with a notched flange, protecting leaves engaging the outer surface of the packing member, each leaf having oppositely disposed notches to receive said flange, and a neck to engage one of the notches of the flange.

13. A swab as claimed in claim 12, including means associated with said cage for adjustably forcing the upper ends of the leaves toward the axis of the stem.

14. A swab as claimed in claim 12, including a collar having threaded engagement with said cage, and engaging said leaves for adjustably forcing the upper ends of the leaves toward the axis of the stem.

15. In a swab, a stem, a hollow ball-like elastic packing member having its ends embracing the stem, a protecting cap slidably mounted on the stem and engaging one end of said packing member, and rigid adjustable leaf protectors mounted on the stem and embracing the opposite end of the packing member.

In testimony whereof I affix my signature.

STEPHEN V. DILLON.